United States Patent [19]
Sheehy

[11] Patent Number: 5,309,531
[45] Date of Patent: May 3, 1994

[54] BROAD-BAND SUBSTRATE-WAVE-COUPLED ELECTRO-OPTIC MODULATOR

[75] Inventor: Finbar Sheehy, Pasadena, Calif.
[73] Assignee: California Institute of Technology, Pasadena, Calif.
[21] Appl. No.: 975,393
[22] Filed: Nov. 12, 1992
[51] Int. Cl.[5] .................................. G02F 1/01
[52] U.S. Cl. ................................ 385/2; 385/3; 343/720
[58] Field of Search ......................... 385/2, 1, 3-8, 385/14; 343/720, 776

[56] References Cited

U.S. PATENT DOCUMENTS

| | | | |
|---|---|---|---|
| 4,691,984 | 9/1987 | Thaniyavarn | 385/2 X |
| 5,076,655 | 12/1991 | Bridges | 385/2 X |
| 5,101,293 | 3/1992 | Kemeny | 385/14 X |
| 5,150,436 | 9/1992 | Jaeger et al. | 385/3 X |
| 5,153,930 | 10/1992 | DuPuy et al. | 385/1 X |

Primary Examiner—John D. Lee
Assistant Examiner—Phan T. Heartney
Attorney, Agent, or Firm—Robert M. Wallace; Michael L. Keller

[57] ABSTRACT

An electro-optic modulator in which the input electromagnetic signal is launched as a substrate mode in the electro-optic material. Broadband endfire antennas on the top surface of the substrate couple the signal to electrodes positioned above the optical waveguide in the substrate to concentrate the input signal and achieve high electric field strength in the vicinity of the optical waveguide. The endfire antennas are oriented with respect to the optical waveguides so as to compensate for the phase velocity mismatch between the electromagnetic signal and the light beam in the optical waveguide.

21 Claims, 4 Drawing Sheets

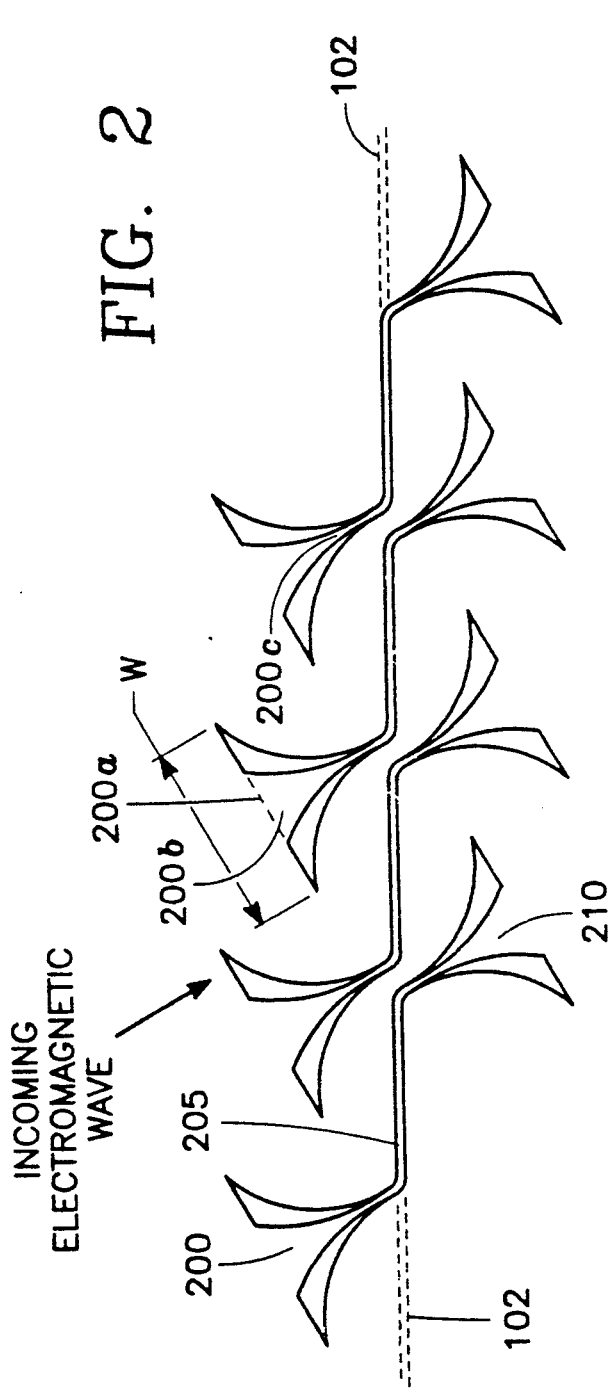
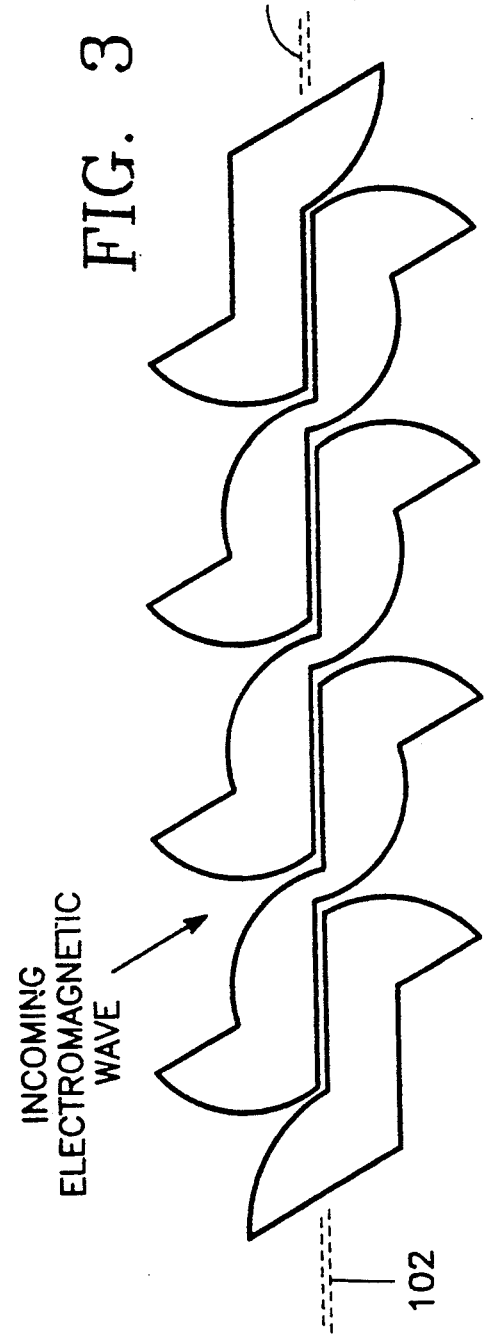

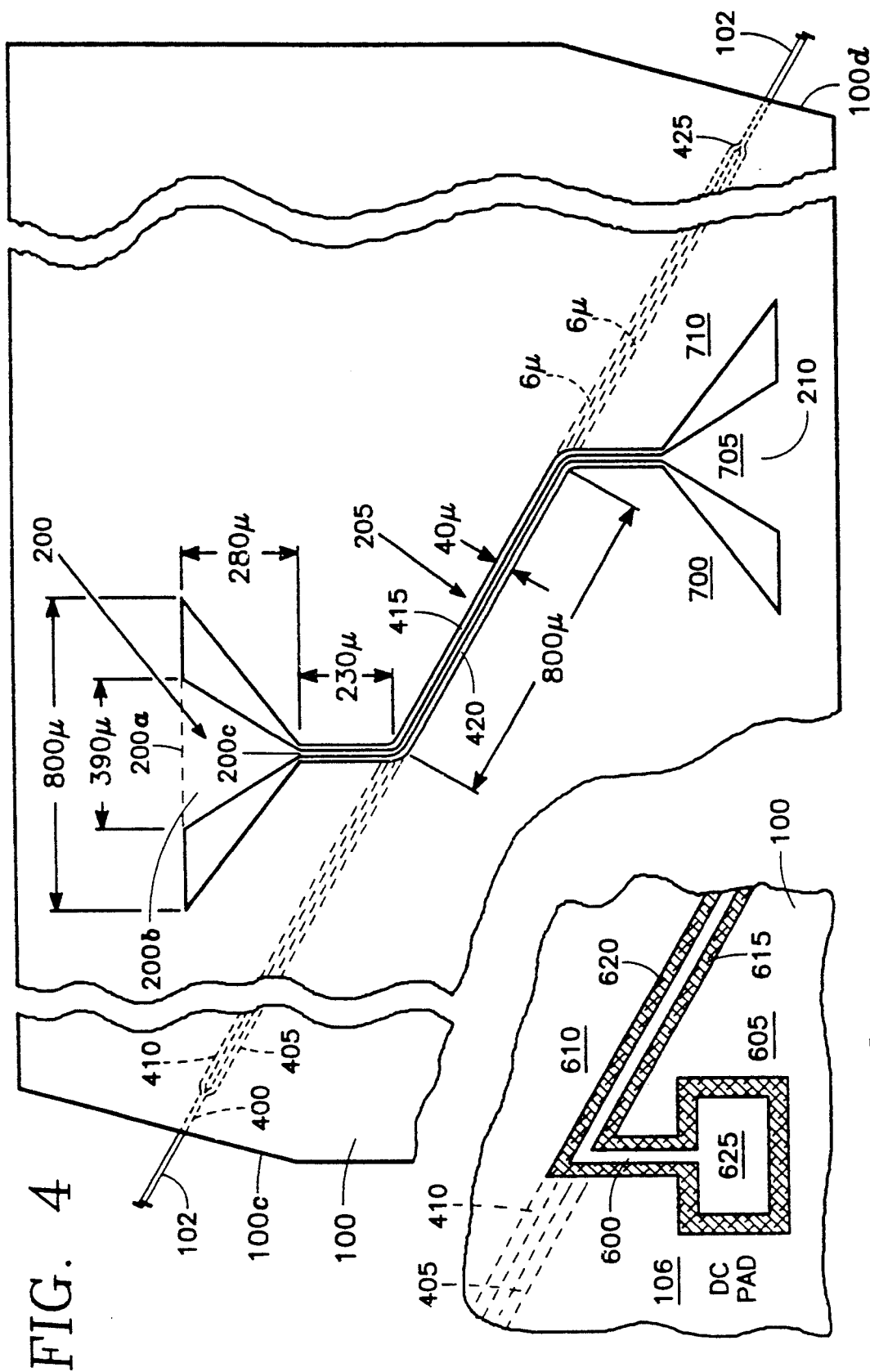

BROAD-BAND SUBSTRATE-WAVE-COUPLED ELECTRO-OPTIC MODULATOR

BACKGROUND OF THE INVENTION

1 Technical Field

The invention is related to optical communications and in particular to electro-optic modulators having broad band-width.

2. Background Art

Electro-optic modulators of the type which modulate a light beam with an RF or microwave signal using the electro-optic effect are described in U.S. Pat. No. 5,076,655. As described therein, the top surface of a crystalline Lithium Niobate substrate has a series of planar broadside RF antennas overlying an optical waveguide in the substrate. A light beam to be modulated travels through the optical waveguide. A modulating RF or microwave signal is directed toward the series of RF antennas through the substrate at an angle with respect to the top surface corresponding to the arcsin of the ratio of the phase velocities of the light beam and the RF signal in the substrate. The broadside RF antennas direct the RF signal's energy to the light beam, causing the RF signal to phase modulate the light beam in the optical waveguide. The particular angle described above related to the ratio of the phase velocities of the light beam and RF signal compensates for the difference in phase velocities of the light beam and the RF signal so as to maximize the coupling between the RF signal and the light beam.

In the above-referenced patent, a variation of the foregoing is described in which the modulating RF signal or microwave travels from one end of the substrate to the other along the series of broadband RF antennas on the top surface. In this variation, the RF signal or microwave may be thought of as bouncing between the top and bottom surfaces of the substrate at an angle corresponding to the angle discussed above (i.e., the arcsin of the ratio of the phase velocities of the RF signal and the light beam in the substrate), so that the RF signal or microwave does not travel parallel to the longitudinal axis of the substrate.

One disadvantage of the foregoing technique is that the RF broadside antennas employed therein have a relatively narrow band response. A related disadvantage is that a external waveguide (such as an additional Lithium Niobate substrate cut at an angle) must be attached to the bottom of the substrate (in the preferred embodiment thereof) to guide the incoming RF signal through the substrate toward the series of broadside RF antennas on the top surface at the desired angle.

Moreover, in the variation mentioned above in which the RF signal travels along the length of the substrate, the distance between the top and bottom substrate surfaces must be precisely adjusted to the wavelength of the RF signal in order to optimize coupling between the RF signal and the light beam. Such optimization therefore occurs only at a predetermined RF frequency, so that the modulator thereof is a narrow-band device.

There is a need for a wide-band electro-optic modulator which is not limited by the narrow-band response of the broadside RF antennas employed in the conventional electro-optic modulator described above. Moreover, there is a need to simplify the construction of such an electro-optic modulator by eliminating the need for an external waveguide to be attached at right angles to guide the incoming RF signal or microwave at the requisite angle toward the RF antennas.

SUMMARY OF THE INVENTION

The invention is an electro-optic modulator in which the modulating electromagnetic wave is launched through the electro-optic substrate parallel to the top surface of the substrate, and the substrate functions as a waveguide to the electromagnetic wave. A series of narrow coupling electrodes connected at their ends to endfire antennas are formed on the substrate top surface overlying the narrow optical waveguide in the substrate and couple the electromagnetic wave to the light beam traveling through the optical waveguide. The endfire antennas are elements which function to gather the incoming electromagnetic wave across a relatively broad front of the endfire antenna and funnel it down to the narrow coupling electrode. For this purpose, each endfire antenna has a broad portion facing the incoming electromagnetic wave and a funneling portion which narrows down to the narrow coupling electrode. A principal advantage of the endfire antennas is that they have a broadband response. Another advantage of the invention is that the substrate acts as the waveguide of the electromagnetic wave and therefore the external waveguide of the prior art (generally attached to the bottom surface of the substrate) is eliminated in the present invention, greatly simplifying the structure. Another advantage of the invention is that the phase response of the endfire antennas is much better because, although the high frequencies are coupled to the antennas later than the low frequencies (as in the prior art), the direction of propagation of the uncoupled signal in the present invention is the same as that of the coupled signal, so that relatively little time-difference occurs between the various frequency components. A further advantage is that the layout is such that the electrodes connected to the endfire antennas can be terminated in matching loads consisting of the same endfire antenna shapes, so that true traveling-wave electrodes are possible. This increases the acceptable length of each electrode overlying the optical waveguide, thus increasing the space available to each endfire antenna element, permitting larger antennas with greater bandwidth. The endfire antennas facilitate the fabrication of the modulator with greater ease (because the external waveguide need not be at right angles to the antennas) and greater packing density relative to broadband antennas of the prior art (because of the greater space available for each antenna).

In order to permit the electro-optic substrate to be an effective waveguide for the modulating electromagnetic wave, the series of electrodes and endfire antennas on the substrate top surface are formed in the preferred embodiment as apertures in a metal layer overlying the substrate top surface. The top surface of the substrate is preferably polished so that the surface of the metal layer facing the interior of the substrate is smooth and efficiently reflects the electrical component of the electromagnetic wave as it travels parallel to the top surface. For this purpose, it is preferable that the modulating electromagnetic wave is polarized so that its electrical component is perpendicular to the substrate top surface and metal layer thereon.

In the preferred embodiment, the electromagnetic wave and the light beam to be modulated both travel parallel to the top surface but at an angle with respect to one another equal to the arcsin of the ratio of their phase velocities in the Lithium Niobate crystal substrate. For this purpose, each endfire antenna is oriented in the direction of the incoming electromagnetic wave, while the electrode connected to it at one end thereof is parallel to and overlies a portion of the optical waveguide. The outgoing antenna section matching the endfire (incoming) antenna is connected to the other end of the electrode and points in the opposite direction of the endfire antenna.

In the preferred embodiment, the electro-optic substrate is an X-cut or Y-cut Lithium Niobate crystal so that the optical axis of the substrate is parallel to the top surface. In this embodiment, the optical waveguides in the substrate are centered under the center of the gaps between the coupling electrodes.

In an alternative embodiment, the electro-optic substrate is a Z-cut Lithium Niobate so that the optical axis thereof is perpendicular to the top surface thereof, in which case the optical waveguides are centered under the edges of the coupling electrodes.

In another alternative embodiment of the invention, the endfire antennas and electrodes are negative images of the preferred embodiment, meaning that they are formed of thin metal shapes so that most of the top surface of the substrate is not covered by a metal layer. In this embodiment, it is best to launch the electromagnetic wave in a direction not parallel to the substrate top surface.

BRIEF DESCRIPTION OF THE DRAWINGS

FIG. 2 is a top view of the embodiment of FIG. 1.

FIG. 3 a top view of an alternative embodiment of an electro-optical modulator of the invention.

FIG. 4 is an enlarged view of a split-V endfire antenna and electrode structure of another embodiment of the invention.

FIG. 6 is an enlarged view of a portion of the DC modulator in the embodiment of FIG. 5.

DETAILED DESCRIPTION OF THE INVENTION

Figure 1A:
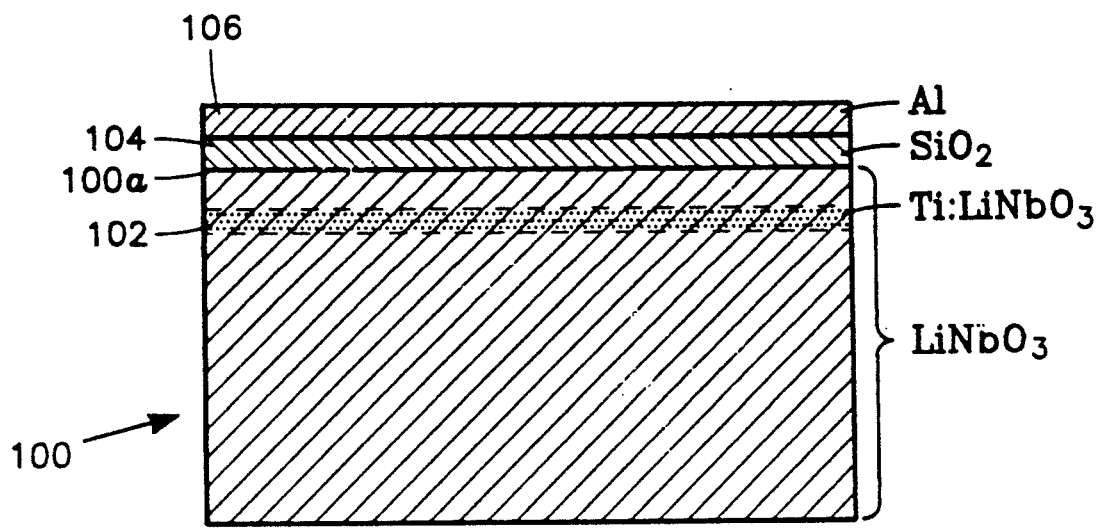
FIGS. 1a and 1b are cross-sectional and perspective views, respectively, of a first embodiment of the electro-optical modulator of the invention.

Referring to FIG.'s 1a, 1b and 2, an X-cut or Y-cut crystalline Lithium Niobate electro-optic substrate 100 has an optical waveguide 102 formed near the substrate top surface 100a by diffusing Titanium in accordance with conventional techniques. A Silicon dioxide layer 104 overlies the top surface 100a and a metal (Aluminum or Ti/Au) layer 106 overlies nearly all of the Silicon dioxide layer 104. Apertures are formed in the metal layer 106 as shown in the top view of FIG. 2, the apertures being locations where metal has been removed to expose the Silicon dioxide layer 104 and indicated as dark areas in FIG. 2. These apertures define a series of antenna conductor elements disposed along and overlying the optical waveguide 102, each antenna conductor element including an endfire antenna 200 oriented in the direction of the incoming electromagnetic wave connected to an input end of an intermediate elongate coupling electrode 205 overlying a portion of the optical waveguide 102, and a matching termination element 210 connected to the output end of the electrode 205 and oriented in a direction opposite to that of the endfire antenna 200. The matching termination element 210 is a mirror image of the endfire antenna 200, as illustrated in the drawing, in order to provide ideal traveling wave conditions. The series of intermediate coupling electrodes 205 effectively covers the length of the optical waveguide 102. Each endfire antenna 200 includes a broad input end 200a, a funnel section 200b which narrows down to a narrow output section 200c connected to the narrow coupling electrode 205. The funneling section 200b funnels or gathers the electromagnetic wave energy captured across the broad input end 200a into the narrow coupling electrode 205, so that the energy is greatly concentrated in the coupling electrode 205.

The angle between the direction of the, incoming electromagnetic wave and the direction of the optical waveguide 102 and intermediate electrodes 205 is the arcsin of the ratio of the phase velocities in the Lithium Niobate substrate 100 of the incoming electromagnetic wave and the light beam in the waveguide 102.

Figure 1B:
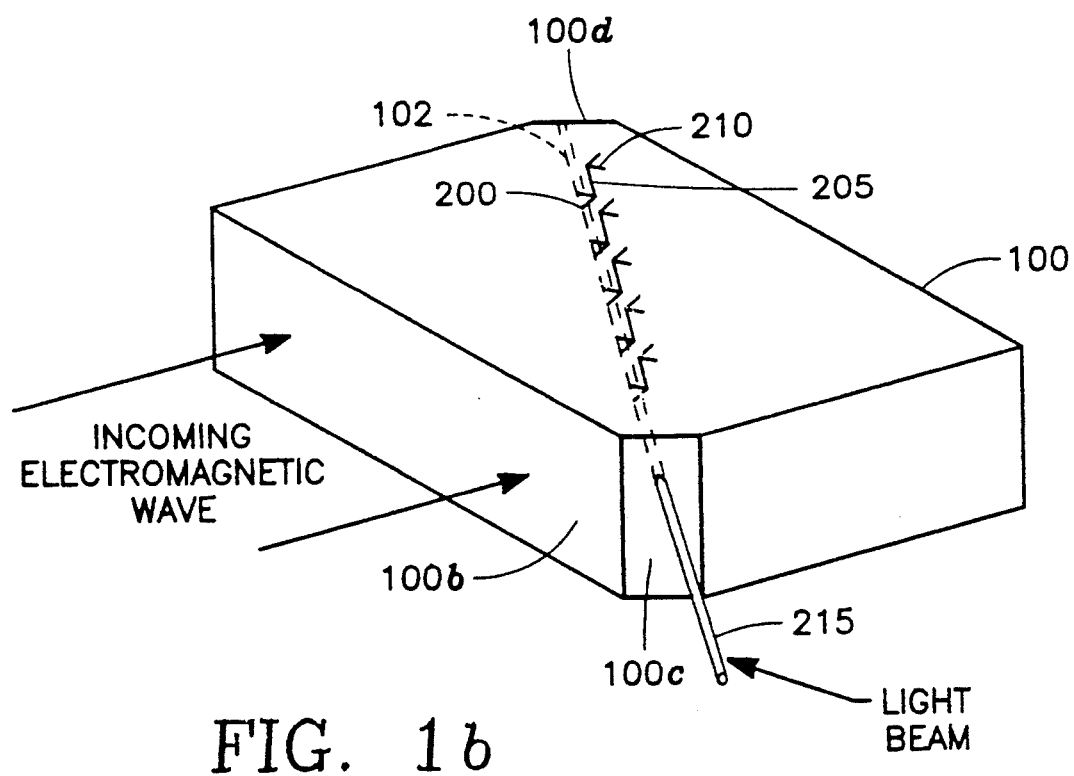

As shown in FIG. 1b, the incoming electromagnetic wave is incident on a polished vertical side surface 100b of the crystalline substrate 100. The optical waveguide 102 terminates in angle-cut surfaces 100c, 100d of the crystalline substrate 100 which are perpendicular to the direction of the optical waveguide 102. The optical waveguide 102 is on the order of 6 microns in cross-section. The light beam to be modulated is applied to the input end of the optical waveguide 102 via an optical fiber 215 having one end attached to the angle-cut surface 100c in registration with the input end of the optical waveguide 102.

Preferably, the opening width W across each endfire antenna 200 (FIG. 2) is on the order of the wavelength in the substrate of the RF modulating signal. The length of each intermediate electrode 205 is also on the order of the RF wavelength. The vertical thickness of the substrate 100 is preferably about 1 millimeter. The drawing of FIG. 2 is generally to scale. The endfire antennas 200 of FIG. 2 are exponentially tapered coplanar strip antennas.

FIG. 3 is a top view corresponding to FIG. 2 but illustrating an alternative embodiment in which each endfire antenna 200 is an exponentially tapered slot antenna.

FIG. 4 is another top view corresponding to FIG. 2 but illustrating another alternative embodiment in which each endfire antenna 200 is a V-slot antenna. FIG. 4 also provides preferred dimensions.

Figure 5:
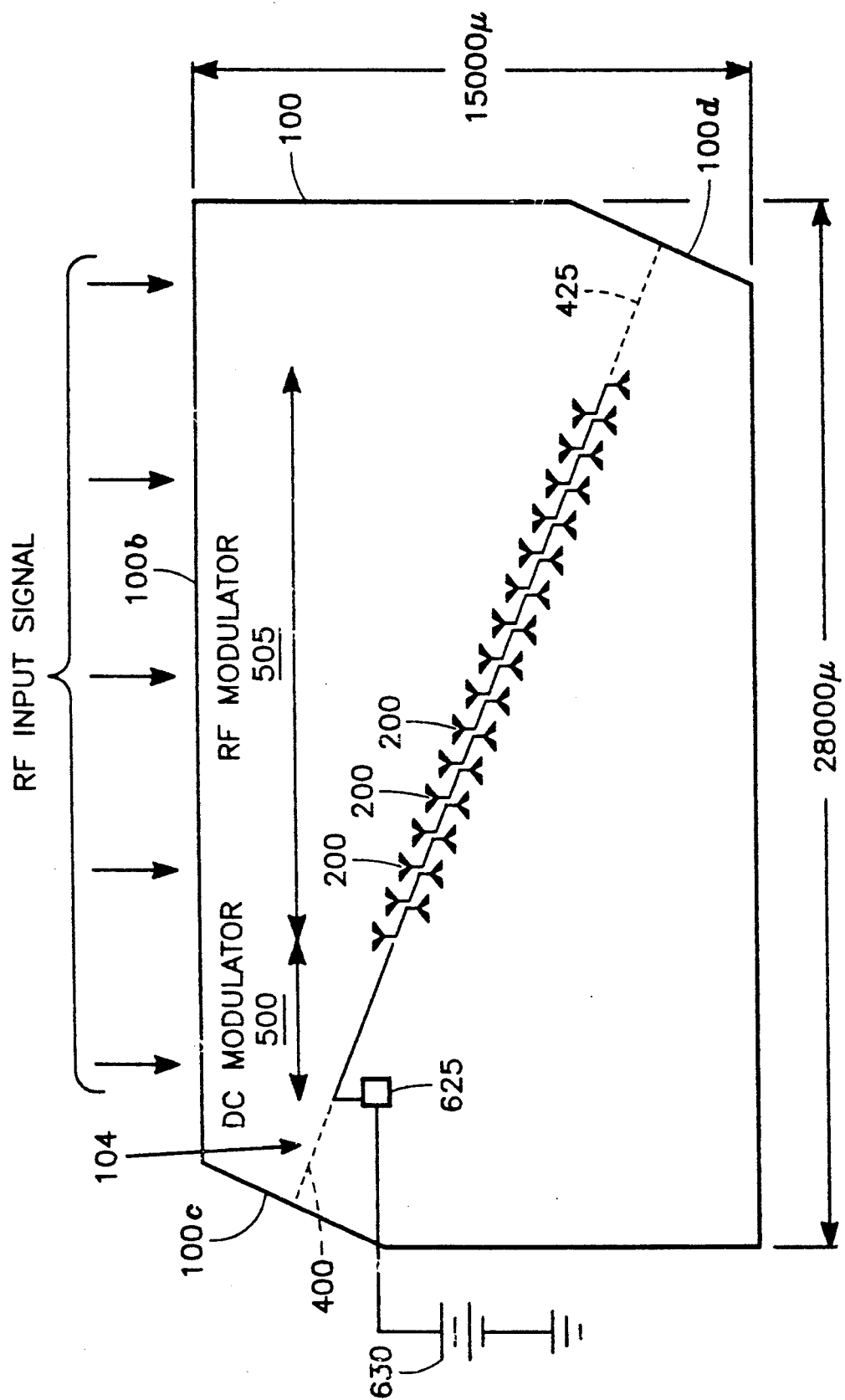
FIG. 5 is a top view of an electro-optical modulator of the capable of performing amplitude modulation.

FIG. 5 is a top view of the entire substrate 100 of another embodiment of the invention employing the V-slot antenna shape of FIG. 4 for each endfire antenna 200. The overall electrode structure includes a DC modulator section 500 near the input end of the optical waveguide 102, followed by an RF modulator like the modulators illustrated in the preceding illustrations herein. (Alternatively, the DC modulator section 500 could be near the output end instead.) However, the embodiment of FIG. 5 is capable of performing amplitude modulation, unlike the earlier embodiments which are capable only of performing phase modulation. For this purpose, the optical waveguide 102 of the embodiment of FIG. 5 is divided as shown in FIG. 4 from an incoming channel 400 into two parallel channels 405, 410, each channel 400, 405, 410 of the waveguide 102 having on the order of a 6 micron cross-section. The apertures 415, 420 of each electrode 205 of FIG. 4 overlies a respective one of the two parallel channels 405, 410 of the optical waveguide 102. In other words, in the embodiment of FIG. 5, each of the waveguide channels 405, 410 is centered under one of the two apertures 415, 420, not under the electrode 205. As illustrated in FIG. 4, the two parallel channels are merged together at the output section 425 of the optical waveguide 102, corresponding to the Mach-Zehnder interferometric amplitude modulation technique discussed in the above-referenced patent. Referring to FIG. 6, the DC modulator section 500 consists of three conductor sections 600, 605, 610 of the metal layer 106 separated by thin apertures 615, 620, the apertures 615, 620 being in registration with the electrode apertures 415, 420 and overlying the parallel channels 405, 410 of the optical waveguide 102. A DC pad 625 connected to a bias voltage source 630 is connected to the middle conductor 600 to impose opposite electric fields in each of the two parallel optical waveguide channels 405, 410, thereby establishing a predetermined phase delay between the two beams carried by the pair of channels 405, 410. The bias voltage is selected so that the predetermined phase delay corresponds to the middle of a dynamic range of the phase difference between the two beams, in accordance with conventional techniques.

While the invention has been described in detail with respect to preferred embodiments in which the antenna apertures lie along a line at an angle to the input electromagnetic wave phase fronts, this is merely intended to indicate that the antennas are positioned so that the signal is received by consecutive antennas delayed by an amount equal to the time taken for the optical signal to get from one antenna to the next. However, it should be understood that the input electromagnetic wavefronts need not be straight. In fact, depending upon the feed system used (external of the substrate 100), they may be curved. If so, the antenna positions can be adjusted (for example, to lie along a gentle arc) to account for this. It is only necessary that the shape of the wavefronts be known.

The embodiments of FIGS. 2 and 4 provide a three-conductor structure for each endfire antenna-coupling electrode combination (the three conductors being labelled 700, 705, 710 in FIG. 4) and are therefore useful in forming the Mach-Zehnder interferometric amplitude modulator of FIG. 5. It should be noted that the embodiment of FIG. 2 may have metal only in the darkened areas of the surface depicted in the drawing to form a two-conductor structure or may have metal everywhere else to form a three conductor structure like the embodiment of FIG. 4. Preferably, as discussed above, the substrate 100 is either X-cut or Y-cut crystalline Lithium Niobate. The embodiment of FIG. 3, on the other hand, has metal only in the darkened areas to provide a two-conductor structure for each endfire antenna-coupling electrode combination. However, this embodiment may also be employed in a Mach-Zehnder interferometric amplitude modulator of the type illustrated in FIG. 5 provided that the substrate 100 is Z-cut crystalline Lithium Niobate and the optical waveguide channels 405, 410 are each centered under respective edges of the coupling electrodes.

While the invention has been described in detail by specific reference to preferred embodiments thereof, it is understood that variations and modifications thereof may be made without departing from the true spirit and scope of the invention.

What is claimed is:

1. An electro-optic modulator comprising:
   an electro-optic substrate having a planar top surface and a relatively narrow optical waveguide beneath said top surface;
   a planar conductor layer overlying said top surface comprising:
   (a) an endfire antenna facing an incoming direction parallel to said top surface and disposed at angle with respect to said narrow optical waveguide, and
   (b) an elongate coupling electrode parallel to and at least nearly overlying said optical waveguide, said elongate coupling electrode being connected to said endfire antenna.

2. The modulator of claim 1 wherein:
   said optical waveguide includes a splitting means which splits said optical waveguide into two waveguide channels,
   said substrate has an optical axis which is parallel to said top surface, and
   each of said two waveguide channels is centered under a respective aperture in said conductive layer defining a respective side of said elongate coupling electrode.

3. The modulator of claim 2 further comprising merging means displaced from said coupling electrode for merging said two waveguide channels into a single waveguide, whereby said modulator comprises a Mach-Zehnder interferometric amplitude modulator.

4. The modulator of claim 3 further comprising DC modulator means overlying said two waveguide channels upstream of said coupling electrode for establishing a predetermined phase difference between light beams in said two waveguide channels equal to one-half of a predetermined dynamic range of phase differences therebetween.

5. The modulator of claim 4 wherein said modulator comprises a coupling electrode defined by a pair of thin apertures in said conductive layer centered over said two waveguide channels and connected at one end thereof to a D.C. pad.

6. The modulator of claim 1 further comprising:
   means for inputting an incoming electromagnetic wave into said substrate along a direction parallel to said incoming direction; and
   means for inputting a light beam into said optical waveguide.

7. The modulator of claim 6 wherein said means for inputting an incoming electromagnetic wave comprise a polished vertical face of said crystalline substrate perpendicular to said incoming direction.

8. The modulator of claim 6 wherein said angle is the arcsin of the ratio of the phase velocities of said light beam and said incoming electromagnetic wave in said electro-optic crystalline substrate.

9. The modulator of claim 6 wherein said means for inputting a light beam comprise a polished angle-cut vertical surface of said substrate perpendicular to and intersecting one end of said waveguide and an optical fiber attached to said angle-cut vertical surface in registration with said optical waveguide.

10. The modulator of claim 9 further comprising a second angle-cut vertical surface of said crystalline substrate perpendicular to said optical waveguide and intersecting an output end of said optical waveguide, said second angle-cut surface being polished.

11. The modulator of claim 1 wherein said endfire antenna comprises:
    a broad input end facing said incoming direction;

a funneling section formed with said input end and having a narrow output end;

a narrow output section having one end facing said incoming direction and connected to said output end of said funneling section and another end parallel to said optical waveguide and connected to an input end of said coupling electrode.

12. The modulator of claim 11 further comprising a matching termination formed in said conductive layer and connected to an output end of said coupling electrode and being a mirror image of said endfire antenna.

13. The modulator of claim 1 wherein said elongate coupling electrode comprises input and output ends and is connected to said endfire antenna at said input end, said planar conductor layer further comprising a matching termination connected to said output end and corresponding in shape opposing orientation to said endfire antenna.

14. The modulator of claim 1 wherein at least a portion of said optical waveguide is split into two waveguide channels, said electro-optical substrate has an optical axis which is perpendicular to said top surface and wherein said two optical channels are centered under respective edges of said coupling electrode.

15. The modulator of claim 1 wherein said endfire antenna comprises an exponentially tapered coplanar strip.

16. The modulator of claim 1 wherein said endfire antenna comprises an exponentially tapered slot antenna.

17. The modulator of claim 1 wherein said endfire antenna comprises a slotted V antenna.

18. The modulator of claim 1 wherein said endfire antenna is defined by narrow apertures in said conductive layer, whereby said conductive layer effectively covers virtually the entirety of said top surface, and wherein said top surface is polished whereby said conductive layer facilitates propagation of an incoming electromagnetic wave through said substrate as a waveguide mode of said substrate.

19. The modulator of claim 1 wherein said substrate has an optical axis which is parallel to said top surface and wherein said coupling electrode is centered over said optical waveguide.

20. The modulator of claim 1 wherein said conductive layer comprises plural endfire antennas similar said endfire antenna and connected to plural coupling electrodes overlying successive elongate sections of said optical waveguide along a broad wavefront of an electromagnetic wave traveling along said incoming direction through said crystalline substrate.

21. The modulator of claim 1 wherein said electrooptic substrate has an optical axis which is generally perpendicular to said top surface and wherein an edge of said coupling electrode is centered with respect to said optical waveguide.

* * * * *